(12) United States Patent
Schloesser et al.

(10) Patent No.: US 10,684,806 B2
(45) Date of Patent: Jun. 16, 2020

(54) METHOD AND SYSTEM FOR AUTOMATED PRINT FAILURE DETECTION AND RE-SUBMISSION

(71) Applicant: Stratasys, Inc., Eden Prairie, MN (US)

(72) Inventors: Ronald G. Schloesser, New Brighton, MN (US); William J. Swanson, St. Paul, MN (US)

(73) Assignee: STRATASYS, INC., Eden Prairie, MN (US)

(*) Notice: Subject to any disclaimer, the term of this patent is extended or adjusted under 35 U.S.C. 154(b) by 0 days.

(21) Appl. No.: 16/232,384

(22) Filed: Dec. 26, 2018

(65) Prior Publication Data

US 2019/0212950 A1 Jul. 11, 2019

Related U.S. Application Data

(60) Provisional application No. 62/612,006, filed on Dec. 29, 2017.

(51) Int. Cl.
| | |
|---|---|
| G06F 3/12 | (2006.01) |
| B29C 64/20 | (2017.01) |
| B29C 64/393 | (2017.01) |
| B33Y 50/02 | (2015.01) |
| B33Y 99/00 | (2015.01) |
| B33Y 10/00 | (2015.01) |
| B33Y 30/00 | (2015.01) |

(52) U.S. Cl.
CPC ............ G06F 3/121 (2013.01); B29C 64/20 (2017.08); B29C 64/393 (2017.08); B33Y 50/02 (2014.12); G06F 3/1234 (2013.01); G06F 3/1263 (2013.01); B33Y 10/00 (2014.12); B33Y 30/00 (2014.12); B33Y 99/00 (2014.12)

(58) Field of Classification Search
CPC ...... G06F 3/121; G06F 3/1234; G06F 3/1263; B29C 64/393; B29C 64/20; B33Y 30/00; B33Y 10/00; B33Y 99/00; B33Y 50/02
See application file for complete search history.

(56) References Cited

U.S. PATENT DOCUMENTS

| | | | |
|---|---|---|---|
| 5,503,785 | A | 4/1996 | Crump et al. |
| 6,004,124 | A | 12/1999 | Swanson et al. |
| 7,384,255 | B2 | 6/2008 | LaBossiere et al. |
| 7,604,470 | B2 | 10/2009 | LaBossiere et al. |
| 7,896,209 | B2 | 3/2011 | Batchelder et al. |
| 8,014,889 | B2 * | 9/2011 | Zinniel ............ B22F 3/008 700/119 |
| 8,153,182 | B2 | 4/2012 | Comb et al. |
| 8,403,658 | B2 | 3/2013 | Swanson |
| 8,459,280 | B2 | 6/2013 | Swanson et al. |
| 8,647,102 | B2 | 2/2014 | Swanson et al. |
| 8,658,250 | B2 | 2/2014 | Batchelder et al. |
| 8,985,497 | B2 | 3/2015 | Mannella et al. |
| 9,073,263 | B2 | 7/2015 | Mannella et al. |

(Continued)

*Primary Examiner* — Neil R McLean
(74) *Attorney, Agent, or Firm* — Westman, Champlin & Koehler, P.A.

(57) ABSTRACT

A method includes receiving an indication that a 3D printer has encountered an error printing an instance of a 3D print job and selecting an idle 3D printer to print the instance of the 3D print job. Previous printing instructions for the instance of the 3D print job are changed based on the selected idle 3D printer and the changed printing instructions are provided to the selected idle 3D printer.

16 Claims, 7 Drawing Sheets

(56) References Cited

U.S. PATENT DOCUMENTS

| | | |
|---|---|---|
| 9,108,360 B2 | 8/2015 | Comb et al. |
| 9,592,539 B2 | 3/2017 | Dunn et al. |
| 9,844,914 B2 | 12/2017 | Pettis et al. |
| 2007/0146772 A1* | 6/2007 | Castellani ............. G06F 3/1208 358/1.15 |
| 2011/0121476 A1 | 3/2011 | Batchelder et al. |
| 2011/0117268 A1 | 5/2011 | Batchelder et al. |
| 2013/0329243 A1* | 12/2013 | Pettis ..................... F16M 11/12 358/1.13 |
| 2016/0087949 A1* | 3/2016 | Deleeuw ............... H04L 63/061 713/170 |

* cited by examiner

METHOD AND SYSTEM FOR AUTOMATED PRINT FAILURE DETECTION AND RE-SUBMISSION

CROSS REFERENCE TO RELATED APPLICATION(S)

This Application claims the benefit of U.S. Provisional Patent Application Ser. No. 62/612,006 entitled METHOD AND SYSTEM FOR AUTOMATED PRINT FAILURE DETECTION AND RE-SUBMISSION that was filed on Dec. 29, 2017, the contents of which are incorporated by reference in its entirety.

BACKGROUND

In additive manufacturing, also known as 3D printing, parts are built by adding material in successive layers using a 3D printer. The printing of a part can fail for a number of reasons including printer-related mechanical errors, interference with previously printed portions of the part or support structures, track following errors, and changing environment conditions (e.g. temperature, pressure, etc.), for example. When an error occurs in a 3D printer, the part must be physically removed from the printer and in some instances, the print head must be cleaned and/or additional part or support material must be loaded into the printer. Once the part is cleared, a human operator typically restarts the building of the part in the same printer that experienced the fault.

SUMMARY

A method includes receiving an indication that a 3D printer has encountered an error printing an instance of a 3D print job and selecting an idle 3D printer to print the instance of the 3D print job. Previous printing instructions for the instance of the 3D print job are changed based on the selected idle 3D printer and the changed printing instructions are provided to the selected idle 3D printer.

In accordance with a further embodiment, a method includes receiving an indication that a 3D printer has encountered an error printing a 3D print job for a 3D part and identifying an idle 3D printer having parameters that match parameters of the 3D print job. A 3D model of the 3D part is then sliced based on the identified idle 3D printer to form printing instructions for the identified idle 3D printer and the printing instructions are provided to the identified idle 3D printer.

In accordance with a still further embodiment, a server includes an error handler that receives an indication that one of a plurality of 3D printers has issued an error while printing a 3D print job and in response retrieves parameters of the 3D print job and submits the parameters of the 3D print job to a matching service. The matching service matches the submitted parameters of the 3D print job to an idle 3D printer that can print the 3D print job and a job instance preparation module creates printing instructions for the 3D print job based on the matched idle 3D printer.

DETAILED DESCRIPTION

In accordance with various embodiments, a server receives an indication that a 3D printer has encountered an error executing a print job. An error log associated with the print job is examined to determine how many times an error has been encountered while printing the print job. If the print job has encountered more than a threshold number of errors, the print job is not sent to another printer and the owner of the print job is notified that the print job has been terminated. If the number of errors is less than the threshold, metadata associated with the print job is retrieved and a priority setting in the metadata is increased. The modified metadata is then placed in a matching queue associated with a matching algorithm. The matching algorithm selects print job metadata from the matching queue based on the priority levels set in the metadata and attempts to find an idle printer with print parameters that match the print parameters set in the selected metadata. Thus, metadata with a higher priority level is matched to an idle printer before metadata with a lower priority level. If an idle printer with matching print parameters is found, printing instructions for printing the job are sent to the idle printer. In accordance with some embodiments, the printing instructions are formed by modifying a template of printing instructions previously formed for the print job or by generating a new template of printing instructions from a digital three-dimensional model of the part.

Figure 1:
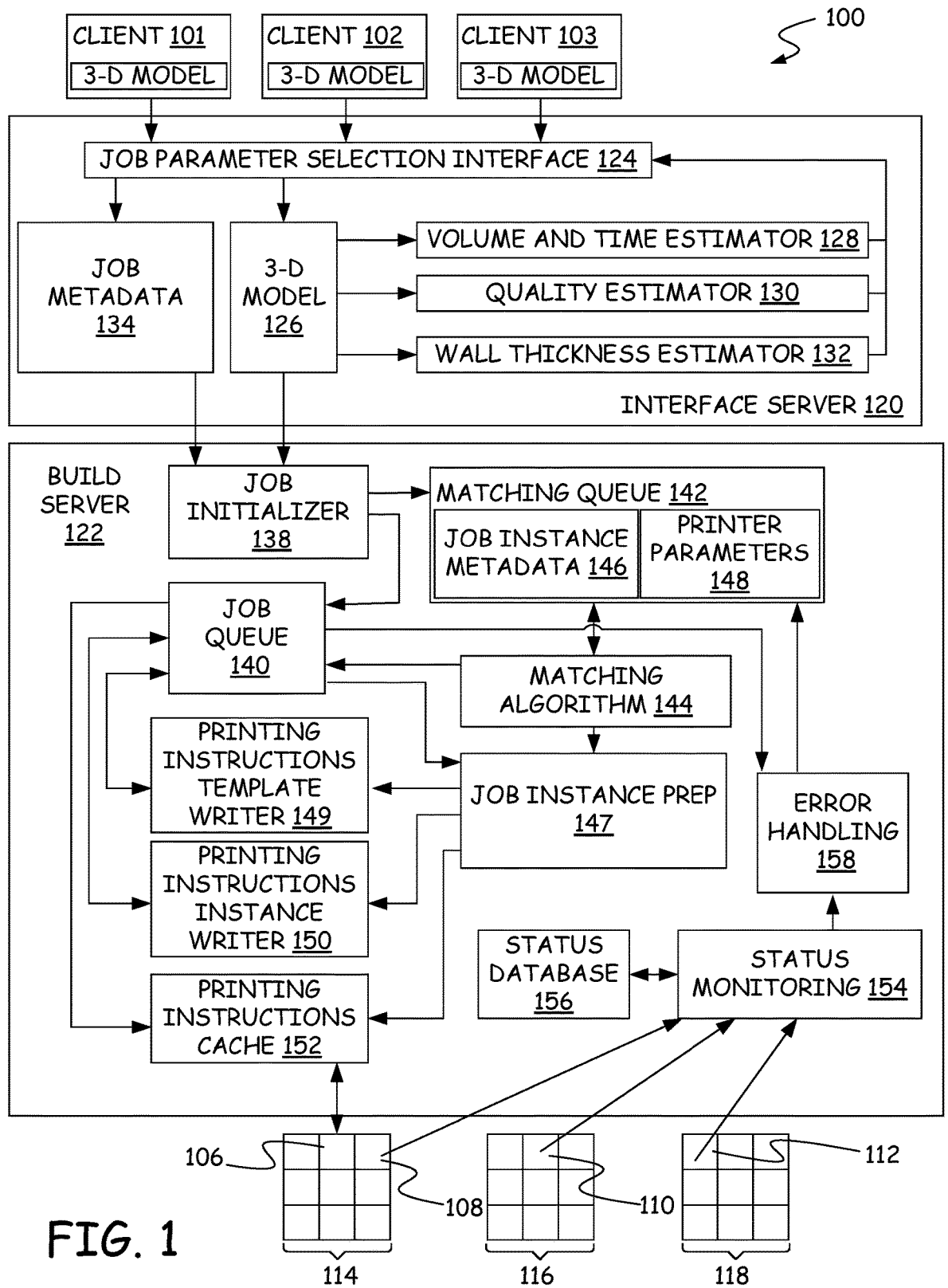
FIG. 1 is a block diagram of a 3D additive manufacturing system in accordance with one embodiment.

FIG. 1 provides a block diagram of a computing system 100 for creating, distributing and managing print jobs across a collection of 3D printers. The print jobs are requested through client devices, such as client devices 101, 102, and 103 and are executed on one or more printers, such as printers 106, 108, 110, and 112, which can be grouped together with other printers to form printer arrays, such as printer arrays 114, 116, and 118. Such printer arrays can be stationed together at a single location or distributed across multiple locations. An interface server 120 and a build server 122 cooperate to create a print job based on interactions with one of client devices 101, 102, and 103, provide the print job to one of the printers and manage the print job by monitoring the status of the print jobs and reassigning print jobs that fail. In accordance with other embodiments, interface server 120 and build server 122 are combined as a single server. In accordance with still further embodiments, interface server 120 and build server 122 are implemented in a cloud computing solution in which the applications depicted as being executed in interface server 120 and build server 122 are executed across a plurality of virtual machines running on one or more servers in a server farm.

Figure 2:
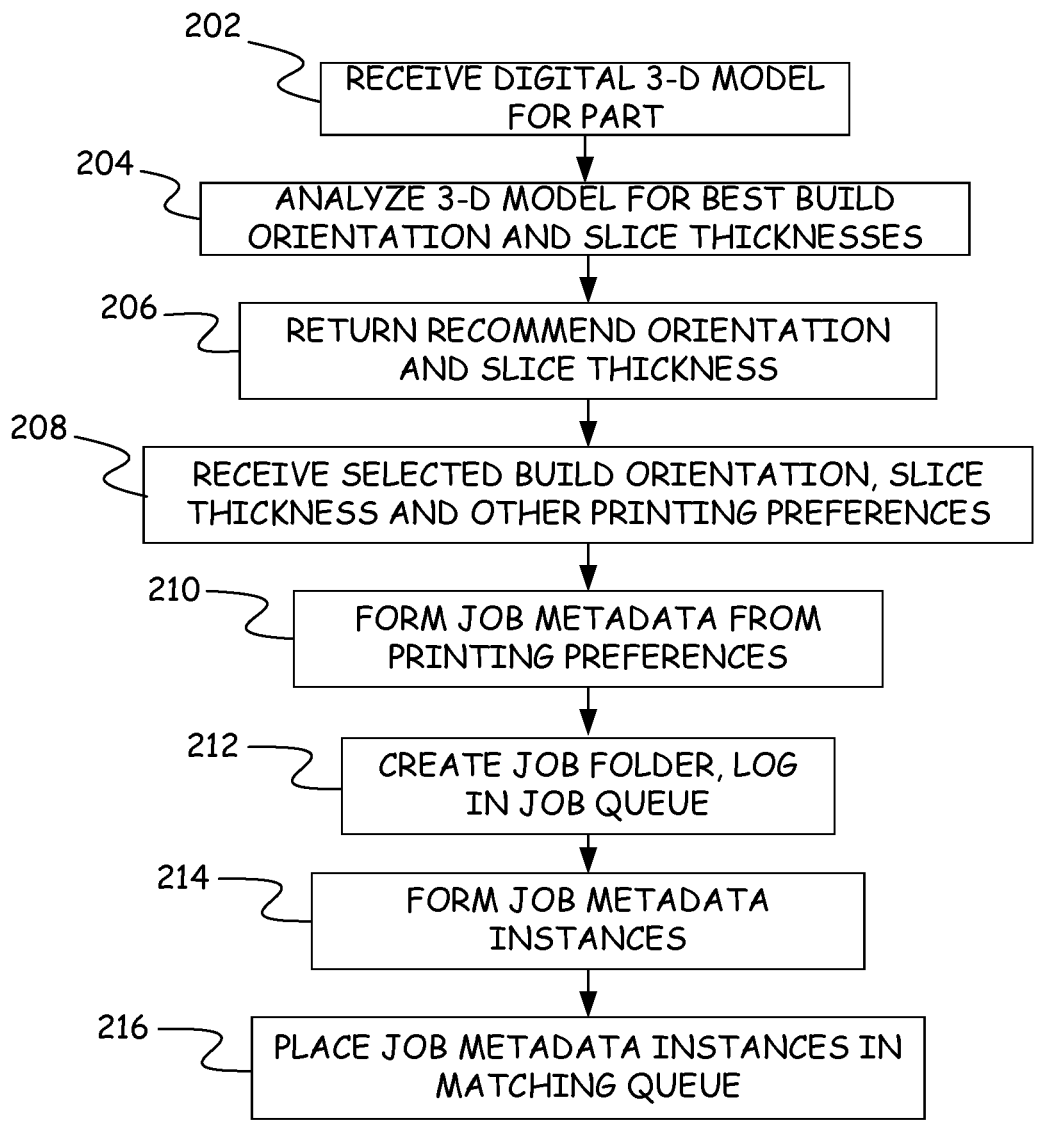
FIG. 2 is a flow diagram of a method of forming job metadata instances.

FIG. 2 provides a flow diagram of a method of creating print jobs in accordance with one embodiment. In step 202 of FIG. 2, a job parameter selection interface 124 on interface server 120 receives a digital three-dimensional model for a part from one of the client devices 101, 102, and 103. In general, the digital three-dimensional model for the part is any suitable digital representation of the three-dimensional part, such as a computer-automated design (CAD) model, a stereolithography (STL) file, a 3DS file, a DEM file, a COLLADA file, an AMF or 3MF file, or any other such file. In this manner, the system can receive and process native CAD files and assemblies from a variety of sources. At step 204, job parameter selection interface 124 analyzes the digital three-dimensional model to identify the best build orientations and slice thicknesses for the part. In particular, job parameter selection interface 124 provides the received digital three-dimensional model 126 to a volume and time estimator 128, a quality estimator 130 and a wall thickness estimator 132. Volume and time estimator 128 estimates the amount of part and support material that will be required to build the part in each of six possible build orientations as well as the amount of time required to build the part in each orientation. In accordance with some embodiments, volume and time estimator 128 also provides a virtual queue indicating the number of print jobs in a job queue 140 of build server 122 that need to be printed before this part will be printed and the estimated amount of time before this part will start printing due to the print jobs in the virtual queue. Quality estimator 130 uses digital three-dimensional model 126 to determine the smoothness of surfaces on the part that can be achieved for various slice thicknesses for each of the six orientations. Wall thickness estimator 132 examines walls within the part at each orientation to identify orientations with wall thicknesses that are too thin to be reliably built using additive manufacturing. Based on the volume and time estimates, the quality estimates, and the wall thickness estimates, job parameter selection interface 124 returns recommended orientations and slice thicknesses to the client device that submitted the digital three-dimensional model at step 206. In other embodiments, additional applications evaluate the digital three-dimensional model and provide suggestions for changing the digital three-dimensional model to improve printing or suggest certain job parameters to improve printing. The user of the client device then selects a build orientation and a slice thickness as well as other printing preferences including nozzle sizes, part materials, support materials, printer types, material colors, and print facilities. In accordance with one embodiment, the user may designate a preferred value for each of these parameters and one or more alternative values in order of preference. For example, the user can designate a first type of 3D printer that should be used if available and an alternative type of 3D printer that should be used only if the preferred type of printer is not available.

At step 208, job parameter selection interface 124 receives the selected orientation, slice thickness and printing preferences and at step 210, uses the received orientation, slice thickness, and printing preferences to form job metadata 134, which is then provided to job initializer 138 on build server 122 together with digital three-dimensional model 126. In accordance with one embodiment, job metadata 134 is formed on client deices 101, 102, 103 based on instructions provided by job parameter selection interface 124. Job metadata 134 contains a list of parameters for the print job. At step 212, job initializer 138 creates job folders and a job log in a job queue 140.

Figure 3:
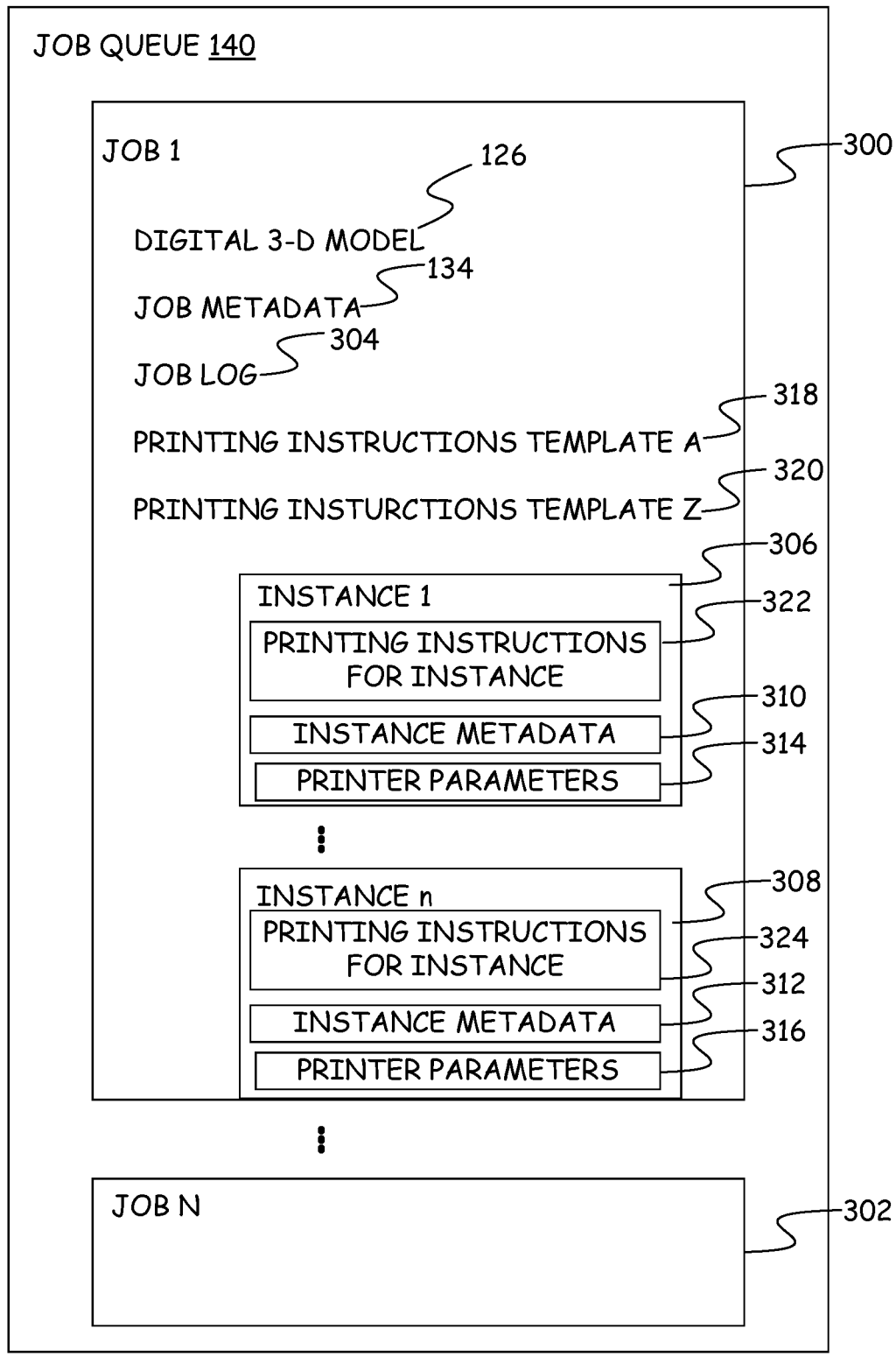
FIG. 3 is a block diagram of a job queue in accordance with one embodiment.

FIG. 3 provides an example of a structure of job queue 140 in accordance with one embodiment. Job queue 140 includes a separate directory or container for each job, such as directory 300 for job 1 and directory 302 for job N. In step 212 of FIG. 2, digital three-dimensional model 126 and job metadata 134 for the new job are stored in job directory 300 along with a job log 304. Job log 304 is used to record attributes of events that occur during printing of the job such as which instances of the job are assigned to which printers, when printing starts and ends for each instance, and the types and numbers of errors that occur while printing the job. At step 212, the remainder of the elements shown in directory 300 have yet to be created.

At step 214, directories or containers, such as directories 306 and 308 are created for each instance of the job and instance metadata, such as instance metadata 310 and instance metadata 312 are created for each instance. In this context, an instance of a job is associated with printing a single part in the job. Many jobs can designate the number of instances of a part that are to be printed from digital three-dimensional model 126. For example, if the digital three-dimensional model describes a phone case, job metadata 134 can indicate that five instances of the phone case are to be printed thereby creating five phone cases as described by digital three-dimensional model 126. In accordance with one embodiment, instance metadata 310 and 312 are initially identical to job metadata 134 with the exception that the instance metadata identifies which instance of the part is to be printed using the instance metadata. Thus, the instance metadata contains a list of parameters for an instance of a print job.

At step 216 of FIG. 2, the metadata for each instance is added to a list of job instance metadata 146 in a matching queue 142. Each instance metadata in matching queue 142 represents a print job instance that is waiting to be assigned a printer. Matching queue 142 also includes a list of printer parameters 148, which contains a separate set of printer parameters for each idle printer that is linked to system 100. Each print job instance in list 146 is matched to an idle printer in list 148 by a matching algorithm or matching service 144 that executes on a periodic basis.

Figure 4:
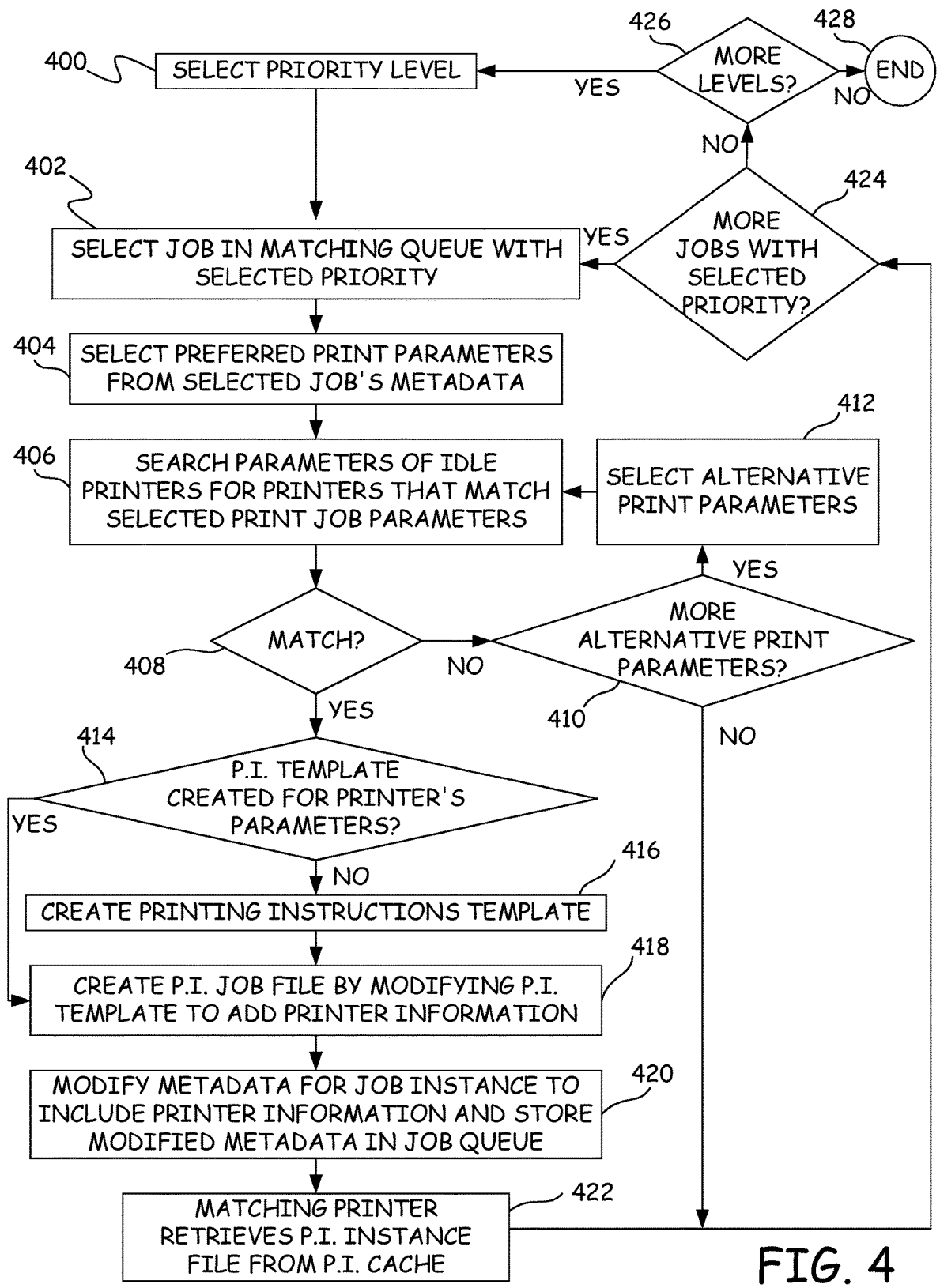
FIG. 4 is a flow diagram of a method for matching job metadata instances to idle printers.

FIG. 4 provides a flow diagram of a method implemented by matching algorithm 144 to match job instance metadata in list 146 to printer parameters in list 148. At step 400 of FIG. 4, a priority level for job instances is selected. Initially, the highest priority level is selected so that job instances with the highest priority level will be matched to an idle printer first. In accordance with one embodiment, the priority level for a job instance is stored within the metadata for that job instance.

In step 402, matching algorithm 144 reads individual job instance metadata in matching queue 142 and selects a job instance with a priority parameter value that matches the priority level selected in step 400. In accordance with some embodiments, the job instance metadata 146 stored in matching queue 142 is ordered based on priority level and then based on the submission date of the print job to facilitate quickly finding job instances of a particular priority level. This sorting can be performed by sorting the job instances when adding a new job instance to matching queue 142 or through a separate step of sorting the job instances before executing matching algorithm 144.

At step 404, preferred print parameters from the selected job's metadata are retrieved and at step 406 the print parameters 148 of idle printers are searched to identify printers that match the selected print job parameters. These parameters can include preferences such as printer type, part material, material color, support material, printer location, printer owner, nozzle type, nozzle width and slice height, for example. In accordance with one embodiment, the printer owners for a printer where a print job can be printed are designated in the print job instances metadata as a result of a user account used to submit digital three-dimensional model 126.

At step 408, matching algorithm 144 determines if a printer with parameters that match the selected job instance's metadata has been found. If a matching printer was not found, matching algorithm 144 examines the job instance metadata to determine if there are alternative print parameters at step 410. If there are alternative print parameters in the job instance metadata, a set of the alternative print parameters is selected at step 412 and the parameters of idle printers are searched once again by returning to step 406 to look for printers with the alternative print parameters. In accordance with one embodiment, during the search for printers that match the job instance metadata, a record is kept of which printing preferences in the metadata could not be matched and alternatives to these non-matching preferences are selected at step 410.

When a printer is found that has parameters that match the selected job instance's metadata at step 408, the job instance metadata and the printer's parameters are removed from matching queue 142, and the printer's parameters are added to the job instance directory in job queue 140. For example, in FIG. 3, printer parameters 314 have been stored for the job instance in instance directory 306 and printer parameters 316 have been stored for the job instance in instance directory 308.

In addition a job instance preparation module 147 is started that determines whether a printing instructions template has already been created for the printer's parameters at step 414. A printing instructions template contains printing instructions for moving printed heads and depositing part material and support material to form the part. In accordance with one embodiment, the printing instructions are in a proprietary "CMB" file format used to control Stratasys FDM® printers. In such embodiments, motion control and system control software embedded on the printers translate the instructions in the CMB file to cause the hardware to act on the materials in precise ways. That process informs performance parameters, such as the temperature of the liquefier, oven or chamber, how long the material must stay at that temperature before being extruded, and various load parameters, such as when to feed material to the extruder and at what feed rate. Descriptions of other printing instruction files are provided in U.S. Pat. No. 9,844,914, which is hereby incorporated by reference in its entirety. Since different printers can have different slice heights, print head dimensions and materials, different printing instructions templates can be created for different printer parameters. If a printing instructions template for the printer's parameters has not been created yet, the printing instructions template is created at step 416 for the printer parameters matched in step 408. In particular, a printing instructions template writer 149 of FIG. 1 retrieves digital three-dimensional model 126 from job queue 140 and uses digital three-dimensional model 126 to identify printing instructions for the printer parameters that were selected at step 408. In accordance with several embodiments, identifying such printing instructions comprises slicing the 3D part model defined by digital three-dimensional model 126 into layers based on the printer parameters and identifying printing instructions for adding material to the printed part for each layer. The created printing instructions templates are stored in the job directories, such as job directory 300. For example, in FIG. 3, two printing instructions templates 318 and 320 have been stored for two different sets of printer parameters.

In accordance with one embodiment, the printing instructions templates are given a name that includes the various printer parameters that the printing instructions template applies to such that by parsing the name of a printing instructions template, it is possible to see if the printing instructions template applies to a set of printer parameters. When performing step 414 to see if a printing instructions template has been previously created for a printer's parameters, job instance prep algorithm 147 performs this parsing on all printing instructions templates listed in the job directory associated with the job instance.

After the printing instructions template has been constructed at step 416 or if the printing instructions template was previously constructed, job instance prep algorithm 147 calls a printing instructions instance writer 150 to create a printing instructions job file for the current job instance at step 418. In accordance with one embodiment, step 418 involves modifying the printing instructions template to include additional printing instructions to print the identity or location of the printer that has been assigned to print the part as well as a unique identifier for the part and the instance of the part that is to be printed. In accordance with one embodiment, the printing instructions print this information on a portion of a substrate that is separate from where the part is to be built. Thus, in addition to creating the part on the substrate, the printer will follow the printing instructions in the printing instructions file to print material in the shape of letters and/or numbers or barcodes or QR codes that identify the location or name of the printer, the unique identifier of the part and the instance of the part. This modified printing instructions job file is then stored within the instance directory as the printing instructions for that instance, such as printing instructions file 322 in instance directory 306 and printing instructions file 324 in instance directory 308. In addition, the modified printing instructions job file is stored in printing instructions cache 152, where it is renamed so that the name of the modified printing instructions job file includes the unique identifier of the printer that has been assigned to print the job instance. Note that each printing instructions file for an instance is unique to that instance because it includes instructions for printing a unique combination of printer name/location and part identifier-instance.

At step 420, job instance prep module 146 modifies the instance metadata, such as instance metadata 310 and 312 to include printer information for the printer that the job instance has been assigned to and stores the modified metadata in the instance directory of job queue 140. At step 422, the matching printer checks printing instructions cache 152 to see if there are any printing instructions job files with filenames that include the printer's unique identifier. If printing instructions cache 152 contains such a printing instructions job file, the printing instructions for the instance is retrieved from the printing instructions cache 152 by the assigned printer.

After step 422 or if no further alternative printer parameters are available in step 410, meaning that the instance metadata cannot be matched to any currently idle printers, the process continues at step 424 where matching algorithm 144 searches list 146 of job instance metadata in matching queue 142 to determine if there are any other job instances with the priority level selected at step 400. If there are additional job instances with the selected priority, the process returns to step 402 to select a new job instance in the matching queue with the selected priority. Steps 404-422 are then repeated for the newly selected job instance. If there are no more jobs with the selected priority at step 422, matching algorithm 144 determines if there are more priority levels at step 426. In particular, matching algorithm 144 determines if there is a lower priority level than the current priority level at step 426. If there is a lower priority level, the next lower priority level is selected at step 400 and steps 402-424 are repeated for the newly selected priority level. When there are no more priority levels at step 426, the matching process of FIG. 4 ends at step 428.

As a printer in one of the printer arrays 114, 116 and 118 executes a print job instance, it periodically sends status files to a status monitoring module 154 in build server 122. These status files are typically sent when a significant event in the building of the part occurs such as when printing begins, when printing ends, when the part is ejected from the printer, when errors occur, and when the printer enters an idle state, for example, and include the identity of the event, the time and date of the event, a current status of the printer after the event, and the printer properties of the printer.

Figure 5:
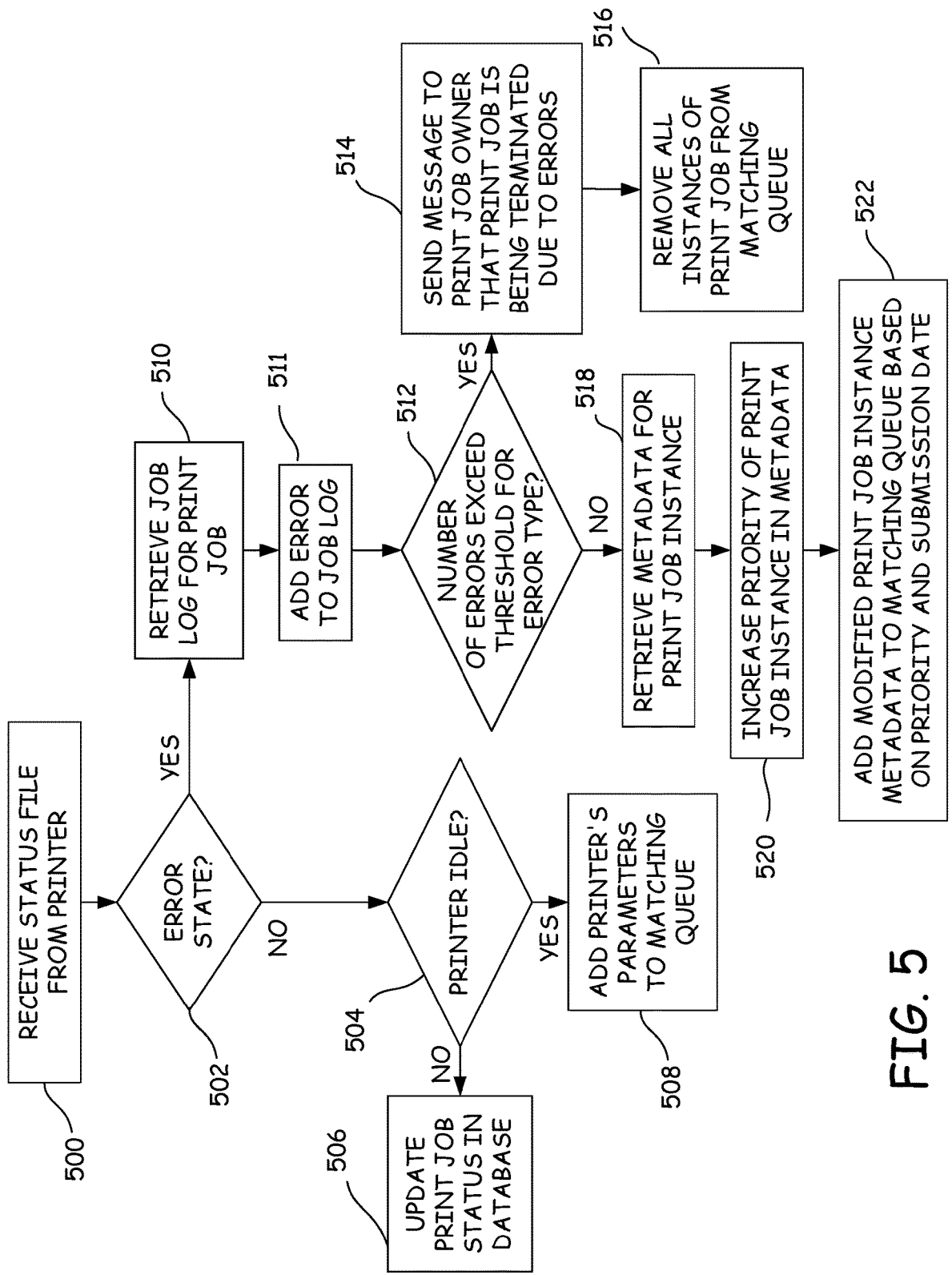
FIG. 5 is a flow diagram for reassigning a print job instance in response to an error printing the print job instance in accordance with one embodiment.

FIG. 5 provides a flow diagram of a method in accordance with one embodiment for processing these status files. In step 500, status monitoring module 154 receives a status file from a printer. If the printer is in an error state, the status file will include an identification of the error state thereby providing an indication that the printer has encountered an error while printing an instance of a 3D print job. At step 502, status monitoring module 154 determines if the printer is in an error state. If the printer is not in an error state, the printer status provided in the status file is examined at step 504. If the printer status is anything but idle, the status of the print job is updated in a status database 156 at step 506. If the printer is idle, status monitoring module 154 adds the printer's parameters found in the status file to idle printer list 148 in matching queue 142 at step 508. By adding the printer's parameters to matching queue 142, status monitoring module 154 allows the idle printer to be matched to a print job that it is waiting to print.

If the printer is in an error state at step 502, status monitoring module 154 invokes error handling module 158 and passes the printer parameters to error handling module 158. At step 510, error handling module 158 uses the printer parameters in the status file to retrieve the job log for the print job instance. In accordance with one embodiment, the printer parameters in the status file include the unique identifier of the part being printed by the printer and this unique identifier can be used to locate the job directory constructed for the part. At step 511, error handling module 158 adds the current error to the job log, such as job log 304 of FIG. 3.

At step 512, error handling module 158 examines the retrieved job log to determine if the job has experienced a number of errors that exceeds a threshold for a particular error type or for all errors in general. In accordance with one embodiment, job log 304 contains a history of all errors encountered by any instance of the job. As such, it is possible to determine the total number of errors that a job has encountered across all error types as well as the number of errors of each type. In the test of step 512, error handling module 158 can compare the number of errors of a specific error type to a threshold for that error type or can compare the total number of errors across all error types to a general threshold for all error types, or both. When using both the specific error type threshold and the general error threshold, error handling module 158 can consider the number of errors to exceed the threshold in step 512 when either threshold is exceeded or only when both thresholds are exceeded.

If the number of errors exceeds the threshold at step 512, error handling module 158 sends a message to the print job owner that the print job is being terminated due to errors at step 514. After the message is sent, the metadata for all instances of the print job are removed from job instances metadata 146 of matching queue 142 at step 516 to prevent the job instances from being matched to other printers. Instances of the print job that are currently printing are allowed to continue printing with the hopes that they can print successfully.

If the number of errors for the print job does not exceed the threshold at step 512, the metadata for the current job instance is retrieved from the instance directory, such as directory 306, of job queue 140 at step 518. The priority parameter of the print job instance is then increased by changing the priority parameter value in the metadata at step 520. Increasing the priority of the job instance means that the job instance will be matched earlier by the matching algorithm and thus will be sent to an idle printer before job instances with lower priorities resulting in the job instance being printed before those other lower priority job instances. At step 522, the modified job instance metadata is added to list 146 of matching queue 142 so that the next time matching algorithm 144 is invoked using the method of FIG. 4, the modified print job instance can be matched to an idle printer (steps 406, 408), modified printing instructions can be generated for the newly matched printer (steps 414, 416, 418) and the modified printing instructions can be provided to the newly matched printer (step 422).

Specifically, the next time matching algorithm 144 is invoked, matching algorithm 144 searches metadata list 146 for job instance metadata with an increased priority before searching for job instance metadata with a standard priority. (Steps 400 and 402) As a result, matching algorithm 144 will select the modified job instance metadata of the previously failed print job instance before job instance metadata of print job instances that have not failed. Matching algorithm 144 then searches for an idle printer with printer parameters that match the job instance metadata of the failed print job instance at steps 406 and 408. When a match is found, printing instructions are generated for the selected idle printer. These printing instructions include changes to the printing instructions that were provided to the printer that failed. In accordance with one embodiment, there are two ways for the previous printing instructions to be changed.

First, a different printing instructions template (318, 320) can be selected/created at steps 414/416. This will occur when alternative print parameters in the job instance metadata are selected instead of the printer parameters that were selected for the print job instance that failed. For example, if none of the idle printers have the same printer parameters that matched previously for the job instance, but one of the idle printers has printer parameters that match alternative parameters in the job instance metadata, a printing instructions template for the newly matching printer parameters is used instead of the printing instructions template of the previously-matching printer parameters. This printing instructions template can be created at step 416 based on the latest match between the selected idle printer and the job instance metadata or can be found as a printing instructions template that was previously constructed before the present match. If the printing instructions template is created at step 416, the 3D part model represented by the digital three-dimensional model for the part is resliced to form new layer information and new printing instructions are generated for each layer in the new layer information to form the new printing instructions template. The new printing instructions in the new printing instructions template are then used as the basis for forming the printing instructions in the printing instructions instance that is retrieved by the newly matched printer at step 422. Note that in accordance with one embodiment, the 3D part model is only resliced if a matching printing instructions template cannot be found for the newly selected printer at step 414.

A second way for the previous printing instructions to be changed, regardless of whether a new printing instructions template is created for the job instance or a previously constructed printing instructions template is selected, is to modify the created/selected printing instructions template at step 418 of FIG. 4. Specifically, the printing instructions in the created/selected printing instructions template are modified to include printing instructions for printing the identity or location of the newly selected printer and the unique identifier and instance of the part associated with the job instance metadata. Thus, when a failed print job instance is redirected to a new 3D printer, the printing instructions provided to the new printer will be changed from those provided to the failed printer, even if the same printing instructions template is used for both printers, because the printing instructions instance file provided to the new printer will include instructions for printing the identity and/or location of the new printer instead of the failed printer.

Figure 6:
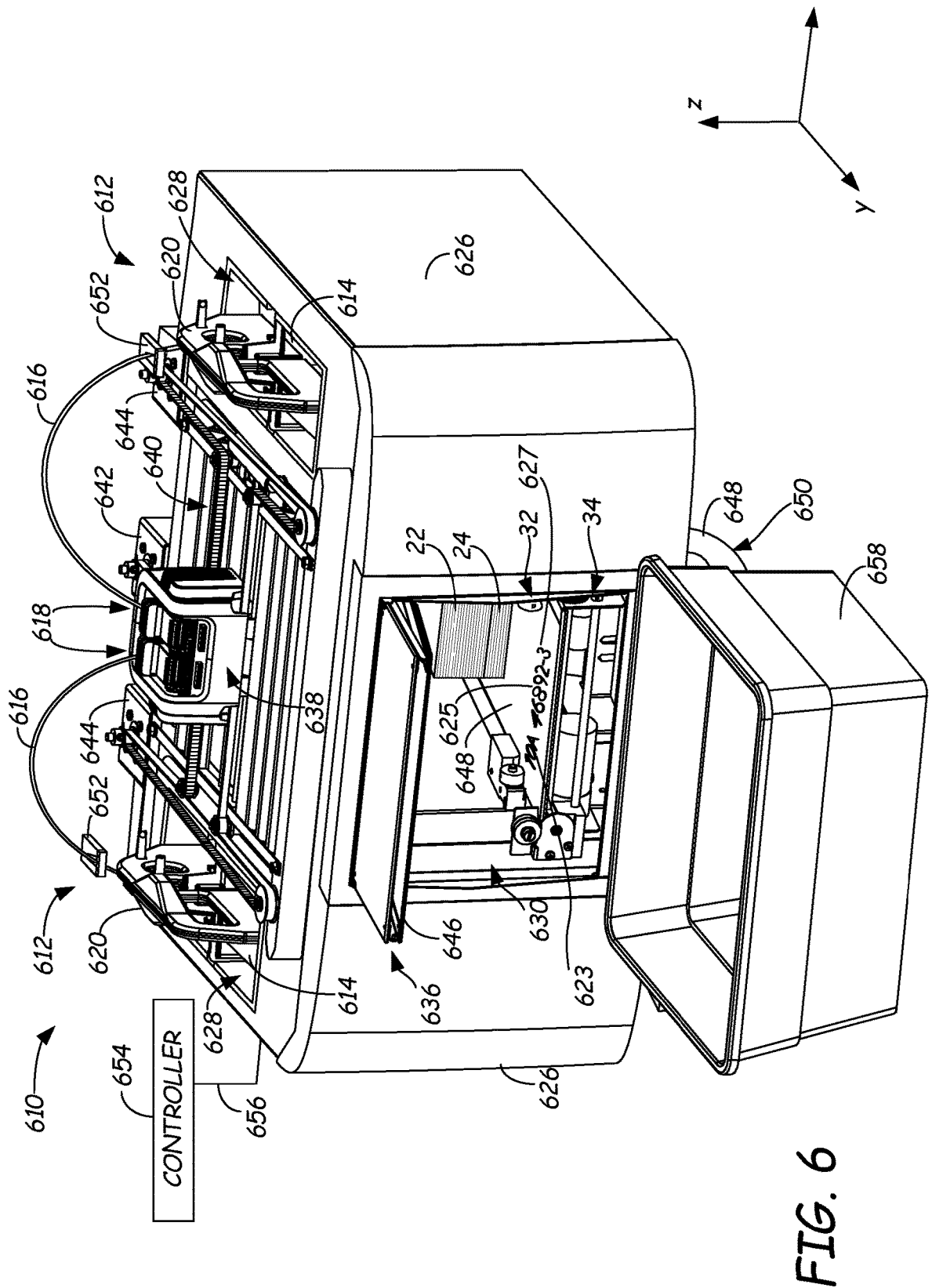
FIG. 6 is a perspective view of an exemplary additive manufacturing system.

FIG. 6 shows an example system 610 in use with two consumable assemblies 612, where system 610 is configured to print and remove 3D parts and support structures in an automated manner, preferably without user intervention. Each consumable assembly 612 is an easily loadable, removable, and replaceable container device that retains a supply of a consumable filament for printing with system 610. Typically, one of the consumable assemblies 612 contains a part material filament ("part material consumable assembly"), and the other consumable assembly 612 contains a support material filament ("support material consumable assembly"). However, both consumable assemblies 612 may be identical in structure.

In the shown embodiment, each consumable assembly 612 includes container portion 614, guide tube 616, print head 618, and handle 620. Container portion 614 may retain a spool or coil of a consumable filament, such as discussed in Mannella et al., U.S. Pat. Nos. 9,073,263 and 8,985,497. In some embodiments, container portions 614 of consumable assemblies 612 may retain large supplies (e.g., 900 cubic inches) of the consumable filaments. This is particularly suitable for use in a printing array 114, 116, and 118 to increase the duration between change-overs of each consumable assembly 612.

Guide tube 616 interconnects container portion 614 and print head 618, where the drive mechanism of print head 618 draws successive segments of the consumable filament from container portion 614 and through guide tube 616. In this embodiment, guide tube 616 and print head 618 are subcomponents of consumable assembly 612, and may be interchanged to and from system 610 with each consumable assembly 612. In alternative embodiments, guide tube 616 and/or print head 618 may be components of system 610, rather than subcomponents of consumable assemblies 612.

System 610 is an additive manufacturing system for printing 3D parts or models and corresponding support structures (e.g., 3D part 622 and support structure 624) from the part and support material filaments, respectively, of consumable assemblies 612, using a layer-based, additive manufacturing technique; and for removing the printed 3D parts and support structures in an automated manner. Suitable additive manufacturing systems for system 610 include extrusion-based systems developed by Stratasys, Inc., Eden Prairie, Minn. under the trademarks "FDM" and "FUSED DEPOSITION MODELING". As shown, system 610 includes system casing 626, two bays 628, chamber 630, platen assembly 632, removal assembly 634, door assembly 636, head carriage 638, head gantry 640, z-axis motor 642, and a pair of x-y motors 644.

System casing 626 is a structural component of system 610 and may include multiple structural sub-components such as support frames, housing walls, and the like. In the shown embodiment, system casing 626 defines the dimensions of bays 628, and of chamber 630. Bays 628 are container bays configured to respectively receive container portions 614 of consumable assemblies 612. Typically, each of bays 628 may be intended to receive either a part material consumable assembly 612 or a support material consumable assembly 612. In an alternative embodiment, bays 628 may be omitted to reduce the overall footprint of system 610. In this embodiment, container portions 614 may stand adjacent to system casing 626, while providing sufficient ranges of movement for guide tubes 616 and print heads 618. Bays 628, however, provide convenient locations for loading consumable assemblies 612.

Chamber 630 is an enclosable environment that contains platen assembly 632 and removal assembly 634 for printing 3D parts and support structures such as 3D part 622 and support structure 624, and identifying information such as printer identifier 623, unique print job identifier 625 and job instance number 627. Chamber 630 may be heated (e.g., with circulating heated air) to reduce the rate at which the part and support materials solidify after being extruded and deposited (e.g., to reduce distortions and curling), or otherwise maintained to provide a controlled environment. In alternative embodiments, chamber 630 may be omitted and/or replaced with different types of build environments. For example, 3D part 622, support structure 624, printer identifier 623, unique print job identifier 625 and job instance number 627 may be built in a build environment that is open to ambient conditions or may be enclosed with alternative structures (e.g., flexible curtains).

In the shown embodiment, chamber 630 is accessible through door assembly 636, which, in the shown embodiment, includes bi-fold door 646 (shown in an open state). Door assembly 636 allows the printed 3D part 622, support structure 624, printer identifier 623, unique print job identifier 625 and job instance number 627 to be removed from system 610 in an automated manner via platen assembly 632 and removal assembly 634. While illustrated with bi-fold door 646, door assembly 636 may alternatively include different automated door designs, such as accordion-based doors, hinged doors, and the like.

Platen assembly 632 is supported by a platen gantry of system 610 (not shown in FIG. 6), where the platen gantry is configured to move platen assembly 632 along (or substantially along) the vertical z-axis and is powered by z-axis motor 642. Platen assembly 632 is configured to receive and restrain film or substrate 648. Film 648 is preferably a flexible film that functions as a receiving surface for printing 3D part 622, support structure 624, printer identifier 623, unique print job identifier 625 and job instance number 627. In accordance with the shown embodiment, film 648 is drawn from a spool supply 650 that may be located outside of chamber 630 and/or system 610. Film 648 preferably exhibits good bond strengths to support structure 624, allowing support structure 624 to anchor 3D part 622 to reduce the effects of curling. For example, film 648 may be fabricated from one or more materials, such as polycarbonate, acrylic/alkyl acrylic, paper-based, polyester, cellulose, polyamide and/or polyolefin materials, and may be a multi-layer film.

In comparison to platen assembly 632, in the shown embodiment, removal assembly 634 is secured to the front end of chamber 630, adjacent to door assembly 636. As such, the movement of platen assembly 632 along the vertical z-axis engages and disengages platen assembly 632 to and from removal assembly 634. In an alternative embodiment, removal assembly 634 may be secured to the front end of platen assembly 632, allowing removal assembly 634 to move along the vertical z-axis with platen assembly 632. However, removal assembly 634 and spool supply 650 are preferably separate from platen assembly 632, thereby reducing the weight of platen assembly 632, and fixed relative to chamber 630.

Head carriage 638 is a unit configured to receive one or more removable print heads, such as print heads 618, and is supported by head gantry 640. Examples of suitable devices for head carriage 638, and techniques for retaining print heads 618 in head carriage 638, include those disclosed in Swanson et al., U.S. Pat. Nos. 8,403,658 and 8,647,102.

As mentioned above, in some embodiments, guide tube 616 and/or print head 618 may be components of system 610, rather than subcomponents of consumable assemblies 612. In these embodiments, additional examples of suitable devices for print heads 618, and the connections between print heads 618 and head gantry 640 include those disclosed in Crump et al., U.S. Pat. No. 5,503,785; Swanson et al., U.S. Pat. No. 6,004,124; LaBossiere, et al., U.S. Pat. Nos. 7,384,255 and 7,604,470; Batchelder et al., U.S. Pat. No. 7,896,209; and Comb et al., U.S. Pat. No. 8,153,182. Moreover, in alternative embodiments, print heads 18 may utilize different deposition-based additive manufacturing techniques. For example, print heads 618 may be inkjet-based print heads, each having one or more arrays of inkjet orifices to print 3D part 622, support structure 624, printer identifier 623, unique print job identifier 625 and job instance number 627.

In the shown embodiment, head gantry 640 is a belt-driven gantry assembly configured to move head carriage 638 (and the retained print heads 618) in (or substantially in) a horizontal x-y plane above chamber 630, and is powered by x-y motors 644. Examples of suitable gantry assemblies for head gantry 640 include those disclosed in Comb et al., U.S. Pat. No. 9,108,360.

In an alternative embodiment, platen assembly 632 may be configured to move in the horizontal x-y plane within chamber 630, and head carriage 638 (and print heads 618) may be configured to move along the z-axis. Other similar arrangements may also be used such that one or both of platen assembly 632 and print heads 618 are moveable relative to each other. Platen assembly 632 and head carriage 638 (and print heads 618) may also be oriented along different axes. For example, platen assembly 632 may be oriented vertically and print heads 618 may print 3D part 622, support structure 624, printer identifier 623, unique print job identifier 625 and job instance number 627 along the x-axis or the y-axis.

As further shown in FIG. 6, system 610 may also include a pair of sensor assemblies 652, which, in the shown embodiment, are located adjacent to bays 628. Sensor assemblies 652 are configured to receive and retain guide tubes 616, while also providing sufficient ranges of movement for guide tubes 616 and print heads 618. Sensor assemblies 652 are also configured to read encoded markings from successive segments of the consumable filaments moving through guide tubes 616. Examples of suitable devices for sensor assemblies 652 include those disclosed in Batchelder et al., U.S. Patent Application Publication Nos. 2011/0117268, 2011/0121476, and U.S. Pat. No. 8,658,250.

System 610 also includes controller 654, which is one or more control circuits configured to monitor and operate the components of system 610. For example, one or more of the control functions performed by controller 654 can be implemented in hardware, software, firmware, and the like, or a combination thereof. Controller 654 may communicate over communication line 656 with print heads 618, chamber 630 (e.g., with a heating unit for chamber 630), removal assembly 634, door assembly 636, head carriage 638, motors 642 and 644, sensor assemblies 654, and various sensors, calibration devices, display devices, and/or user input devices. In some embodiments, controller 654 may also communicate with one or more of bays 628, platen assembly 632, head gantry 640, and any other suitable component of system 610. In further embodiments, controller 654 may also direct the operation of platen assembly 632, removal assembly 634 and/or door assembly 636 based on information received from other components of system 610, such as from sensor assemblies 654.

While illustrated as a single signal line, communication line 656 may include one or more electrical, optical, and/or wireless signal lines, allowing controller 654 to communicate with various components of system 610. Furthermore, while illustrated outside of system 610, controller 654 and communication line 656 may be internal components to system 610.

Controller 654 communicates with build server 122 and receives printing instructions instances from printing instructions submission module 152. Based on the tool paths in the printing instructions instances, controller 654 controls the various hardware components in system 610 to print 3D part 622, support structure 624, printer identifier 623, unique print job identifier 625 and job instance number 627. When an error occurs, controller 654 stops the building of the part and generates a status file that identifies the error as discussed above. Controller 654 then transmits this status file status monitoring module 154 in build server 122.

System 610 is also shown in use with bucket 658 retained by casing 626 adjacent to door assembly 636. Bucket 658 is a receptacle configured to receive the printed 3D part 622, support structure 624, printer identifier 623, unique print job identifier 625 and job instance number 627 when removed from system 610. After 3D part 622, support structure 624, printer identifier 623, unique print job identifier 625 and job instance number 627 are printed, removal system 634 preferably draws film 648 until the segment of film 648 retaining the printed 3D part 622, support structure 624, printer identifier 623, unique print job identifier 625 and job instance number 627 passes removal assembly 634 and extends through the opening of door assembly 636. Removal system 634 then cuts film 648, allowing the printed 3D part 622, support structure 624, printer identifier 623, unique print job identifier 625 and job instance number 627 to fall into bucket 658. In some embodiments, bucket 658 may be lined with one or more cushioning materials to reduce any impact that 3D part 622, support structure 624, printer identifier 623, unique print job identifier 625 and job instance number 627 may be subjected to when removed from system 610.

In alternative embodiments, bucket 658 may be replaced by other suitable devices for receiving the removed 3D part 622, support structure 624, printer identifier 623, unique print job identifier 625 and job instance number 627. For example, bucket 658 may be replaced with a support removal system (not shown), which may optionally communicate with controller 654 and/or the host computer. In this embodiment, 3D part 622, support structure 624, printer identifier 623, unique print job identifier 625 and job instance number 627 may drop out of chamber 630 and into the support removal system to remove support structure 624 from 3D part 622, also preferably in an automated manner. Examples of suitable support removal systems include those disclosed in Swanson et al., U.S. Pat. No. 8,459,280; and Dunn et al., U.S. Pat. No. 9,592,539.

In a further alternative embodiment, bucket 658 may be replaced with a conveyor mechanism, where the removed 3D part 622, support structure 624, printer identifier 623, unique print job identifier 625 and job instance number 627 may drop onto a conveyor belt, which transports the received 3D part 622, support structure 624, printer identifier 623, unique print job identifier 625 and job instance number 627 to a desired location away from system 610. This is suitable for use with printing arrays 114, 116, and 118 where a network of conveyor belts may transport the 3D parts and support structures from the individual systems 610 to one or more locations for further processing (e.g., support removal).

Figure 7:
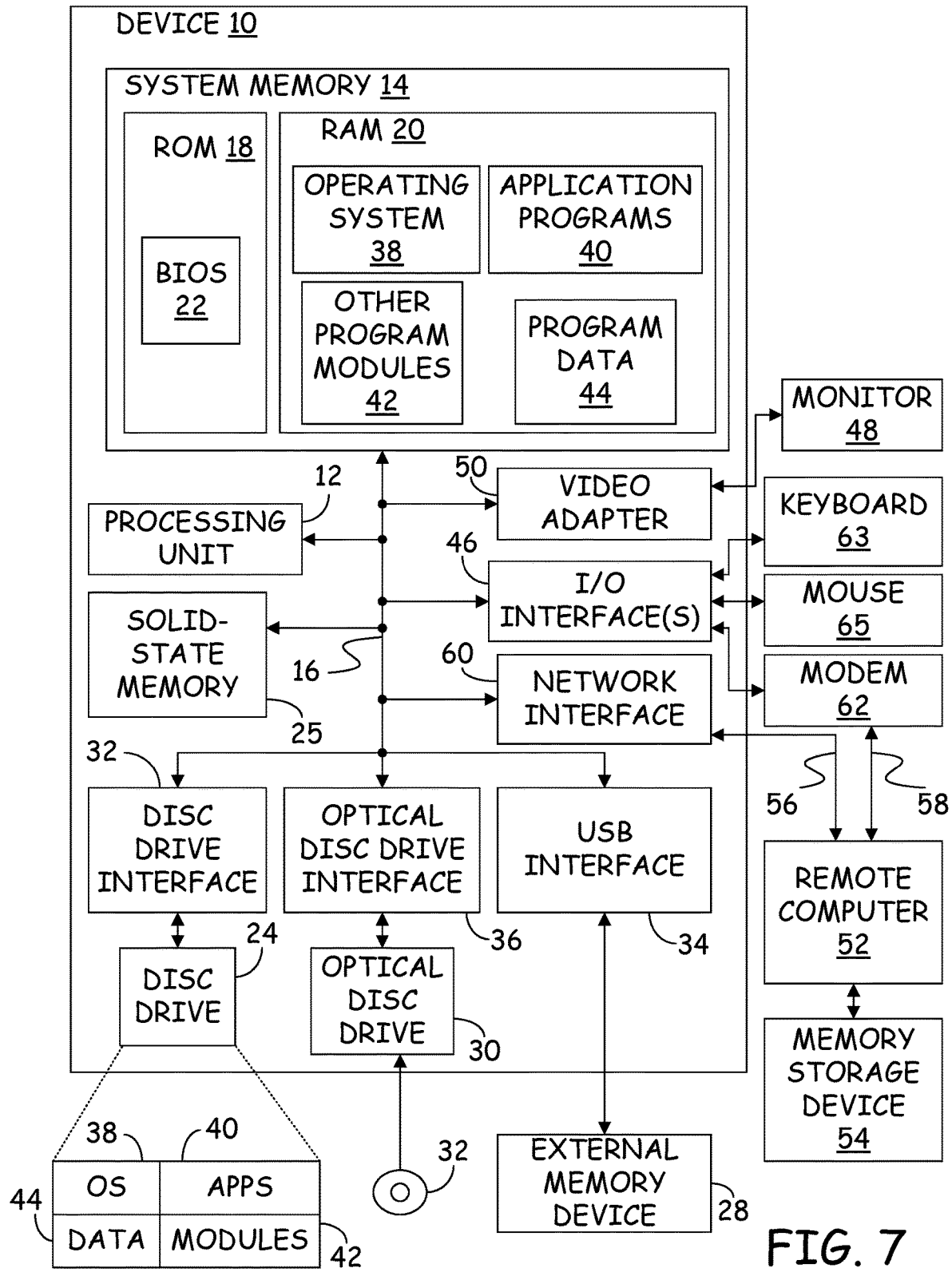
FIG. 7 is a block diagram of a computing device that is used as either a client or server in accordance with the various embodiments.

FIG. 7 provides an example of a computing device 10 that can be used as a server device, client device or controller in the embodiments above. Computing device 10 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes an optional hard disc drive 24, an optional external memory device 28, and an optional optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include programs for implementing any one of job parameter selection interface 124, volume and time estimator 128, quality estimator 130, wall thickness estimator 132, job initializer 138, matching algorithm 144, job instance prep 147, error handling 158, status monitoring 154, printing instructions template writer 149, printing instructions instance writer 150, and printing instructions submission 152, for example. Program data 44 may include data such as digital three-dimensional model 126, job metadata 134, matching queue 142, job queue 140, and status database 156, for example.

Processing unit 12, also referred to as a processor, executes programs in system memory 14 and solid state memory 25 to perform the methods described above.

Input devices including a keyboard 63 and a mouse 65 are optionally connected to system bus 16 through an Input/Output interface 46 that is coupled to system bus 16. Monitor or display 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 7. The network connections depicted in FIG. 7 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to the computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 7 are exemplary and other means for establishing a communications link between the computers, such as a wireless interface communications link, may be used.

Although the present disclosure has been described with reference to preferred embodiments, workers skilled in the art will recognize that changes may be made in form and detail without departing from the spirit and scope of the disclosure.

The invention claimed is:

1. A method comprising:
receiving an indication that a 3D printer has encountered an error printing an instance of a 3D print job;
selecting an idle 3D printer capable of printing the instance of the 3D print job to print the instance of the 3D print job, wherein selecting the idle 3D printer comprises:
retrieving print parameters of the instance of the 3D print job;
increasing a priority level in the retrieved print parameters to form modified print parameters;
storing the modified print parameters in a matching queue containing print parameters for another 3D print job;
selecting the modified print parameters from the matching queue before the print parameters for the another 3D print job based on the increased priority level; and
identifying the idle 3D printer capable of printing the instance of the 3D print job;
changing previous printing instructions for the instance of the 3D print job based on the selected idle 3D printer; and
providing the changed printing instructions to the selected idle 3D printer.

2. The method of claim 1 wherein matching print parameters of the instance of the 3D print job comprises matching alternative print parameters of the instance of the 3D print job to parameters of the idle 3D printer.

3. The method of claim 1 wherein changing previous printing instructions for the instance of the 3D print job comprises slicing a 3D part model associated with the instance of the 3D print job as part of forming new printing instructions and using the new printing instructions in place of the previous printing instructions.

4. The method of claim 3 wherein before slicing the 3D part model, the method comprises searching for printing instructions previously produced for the 3D print job that match the parameters of the selected printer and only slicing the 3D part model when previously produced printing instructions that match the parameters of the selected printer are not found.

5. The method of claim 1 wherein changing previous printing instructions for the instance of the 3D print job comprises locating printing instructions previously produced for the 3D print job that match the parameters of the selected idle 3D printer, and modifying the located previous printing instructions to include instructions to print an identifier of the selected idle 3D printer.

6. A method comprising:
receiving an indication that a 3D printer has encountered an error printing a 3D print job for a 3D part;
identifying an idle 3D printer having parameters that match parameters of the 3D print job, wherein identifying an idle printer comprises having parameters that match parameters of the 3D print job comprises:
placing parameters of the 3D print job that encountered the error in a list containing parameters for a plurality of other 3D print jobs;
selecting the parameters of the 3D print job that encountered the error from the list;
selecting parameters of an idle 3D printer from a list of idle 3D printers; and
determining that the parameters of the 3D print job that encountered the error match the selected parameters of the idle 3D printer;
slicing a 3D model of the 3D part based on the identified idle 3D printer to form printing instructions for the identified idle 3D printer; and
providing the printing instructions to the identified idle 3D printer.

7. The method of claim 6 wherein identifying an idle 3D printer having parameters that match parameters of the 3D print job comprises identifying an idle 3D printer having parameters that match at least one alternative parameter of the 3D print job.

8. The method of claim 6 wherein placing parameters of the 3D print job that encountered the error in the list comprises altering a priority parameter of the 3D print job that encountered the error so that the parameters of the 3D print job that encountered the error are selected from the list before the parameters of at least one of the other 3D print jobs in the list.

9. The method of claim 6 wherein at least one of the parameters of the identified idle 3D printer is different from a corresponding parameter of the 3D printer that encountered the error.

10. The method of claim 6 further comprising augmenting the printing instructions to print material representing an identifier for the identified idle 3D printer.

11. The method of claim 6 further comprising storing the printing instructions using a name that identifies the parameters of the identified idle 3D printer.

12. The method of claim 6 further comprising before identifying an idle 3D printer having parameters that match parameters of the 3D print job, performing steps comprising:
determining a number of errors the 3D print job has encountered; and
determining that the number of errors is less than a threshold for canceling the 3D print job.

13. A server comprising:
an error handler that receives an indication that one of a plurality of 3D printers has issued an error while printing a 3D print job and in response retrieves parameters of the 3D print job and submits the parameters of the 3D print job to a matching service, wherein the error handler determines a number of times the 3D print job has encountered an error before submitting the parameters of the 3D print job to the matching service;
the matching service matching the submitted parameters of the 3D print job to an idle 3D printer that can print the 3D print job; and
a job instance preparation module that creates printing instructions for the 3D print job based on the matched idle 3D printer.

14. The server of claim 13 wherein the submitted parameters of the 3D print job comprise a priority parameter set by the error handler.

15. The server of claim 14 wherein the matching service selects parameters of 3D print jobs from a list of parameters of 3D print jobs based in part on the priority parameter of the 3D print jobs.

16. The server of claim 13 wherein the job instance preparation model creates the printing instructions by slicing a 3D model of a 3D part.

* * * * *